United States Patent
Kanan et al.

(10) Patent No.: US 12,368,195 B1
(45) Date of Patent: Jul. 22, 2025

(54) NOISE-CONSTRAINED ENERGY STORAGE SYSTEM DISPATCH

(71) Applicant: BrightNight Power LLC, West Palm Beach, FL (US)

(72) Inventors: Nadim Kanan, Irving, TX (US); Mohit Aggarwal, Austin, TX (US)

(73) Assignee: BRIGHTNIGHT POWER LLC, West Palm Beach, FL (US)

( * ) Notice: Subject to any disclaimer, the term of this patent is extended or adjusted under 35 U.S.C. 154(b) by 0 days.

(21) Appl. No.: 19/090,059

(22) Filed: Mar. 25, 2025

(51) Int. Cl.
*H01M 10/633* (2014.01)
*H01M 10/613* (2014.01)
*H01M 10/651* (2014.01)
*H01M 10/6563* (2014.01)

(52) U.S. Cl.
CPC ....... *H01M 10/633* (2015.04); *H01M 10/651* (2015.04); *H01M 10/6563* (2015.04); *H01M 10/613* (2015.04)

(58) Field of Classification Search
CPC ............. H01M 10/633; H01M 10/651; H01M 10/6563; H01M 10/613
See application file for complete search history.

(56) References Cited

U.S. PATENT DOCUMENTS

| 11,624,349 | B2 | 4/2023 | Ou |
| 2011/0227343 | A1 | 9/2011 | Yasugi et al. |
| 2016/0301119 | A1* | 10/2016 | Izumi ................ H01M 10/6563 |
| 2024/0343148 | A1 | 10/2024 | Petniunas et al. |

FOREIGN PATENT DOCUMENTS

DE    10 2023 202 539 A1    9/2024

* cited by examiner

*Primary Examiner* — Lingwen R Zeng
(74) *Attorney, Agent, or Firm* — FOLEY & LARDNER LLP

(57) ABSTRACT

An energy storage system (ESS) including a plurality of independently dispatchable energy storage units (ESUs), a plurality of cooling units corresponding to the plurality of ESUs, and a dispatch controller configured to determine a noise constraint for the ESS, the noise constraint including a noise threshold associated with a geographic location, determine a target ESS dispatch, generate a set of control signals based on the noise constraint and the target ESS dispatch, and transmit the set of control signals to the plurality of ESUs and the plurality of cooling units.

20 Claims, 5 Drawing Sheets

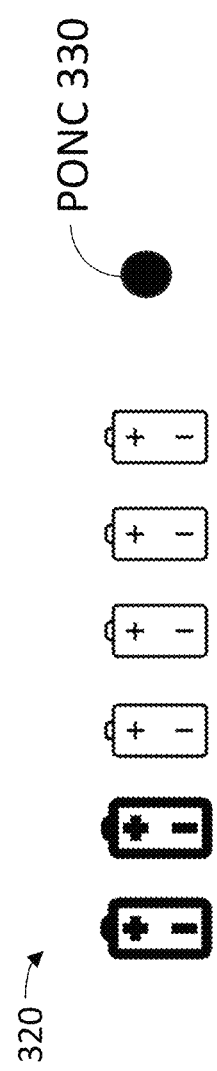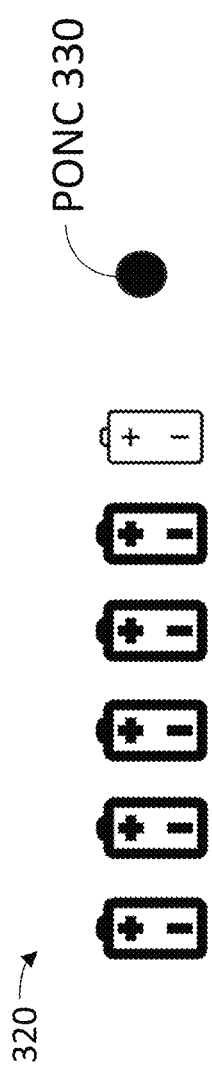

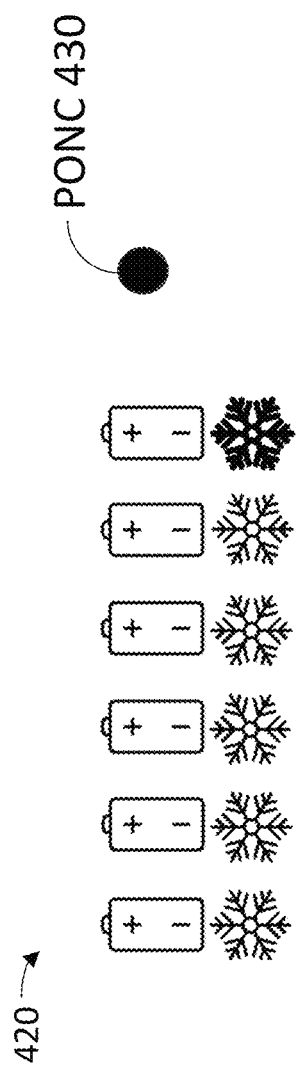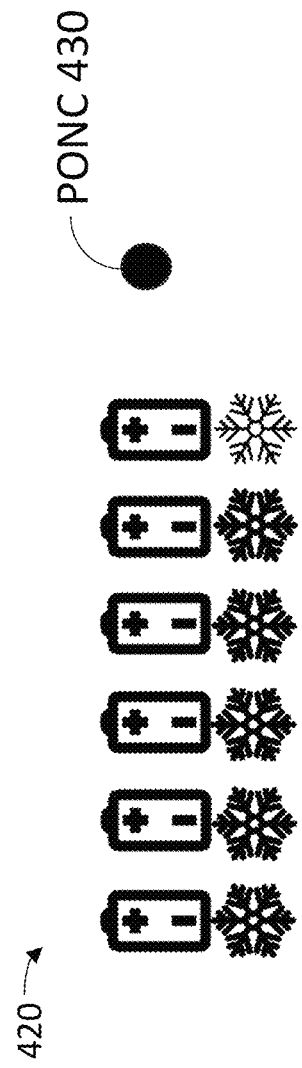
FIG. 4A
FIG. 4B

NOISE-CONSTRAINED ENERGY STORAGE SYSTEM DISPATCH

BACKGROUND

Energy storage systems include one or more energy storage units (ESUs) to store and provide electrical energy. While most of the electrical energy delivered to the ESUs is stored, some of the energy is converted into heat. Thus, the ESUs must be dispatched (i.e., charged/discharged) slowly enough to avoid overheating, or they must be cooled. Cooling of ESUs generates noise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 3A illustrates an example ESS with all energy storage units (ESUs) dispatched.

FIG. 3B illustrates the ESS of FIG. 3A with a minimum subset of ESUs dispatched based on a point of noise control (PONC).

FIG. 3C illustrates the ESS of FIG. 3A with a maximum subset of ESUs dispatched based on a point of noise control (PONC).

FIG. 4A illustrates an example ESS with no ESUs dispatched and a single cooling unit dispatched.

FIG. 4B illustrates the ESS of FIG. 4A with all ESUs dispatched and all but one cooling unit dispatched.

DETAILED DESCRIPTION

Figure 1:
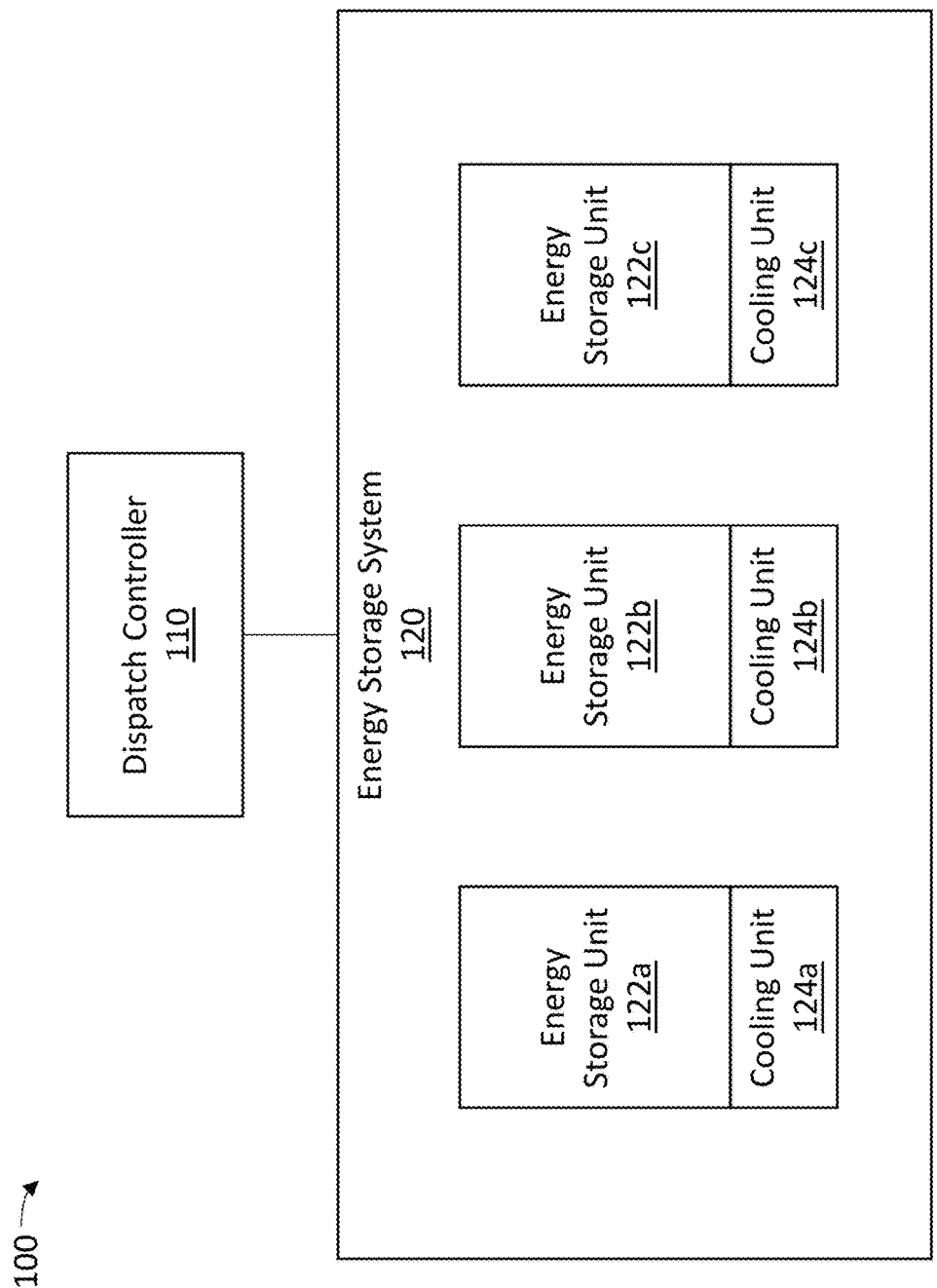
FIG. 1 is a block diagram of an example system including a dispatch controller and an energy storage system (ESS).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Energy storage systems (ESSs) include multiple energy storage units (ESUs) that can be dispatched to meet a total dispatch requirement for the ESS. In conventional solutions, the ESUs generally take an equal share of the total dispatch requirement for the ESS. This equal distribution allows for even distribution of ESU degradation, simplifying maintenance of the ESS. In an example, the ESUs are batteries that degrade based on use (e.g., frequency, intensity, amount), and equal distribution of the total dispatch requirement allows the ESS to function for longer without requiring replacement of an ESU. ESSs generally include cooling units that lower temperatures of the ESUs to prevent degradation and allow for greater dispatch (e.g., charging/discharging). Cooling units generate noise when cooling ESUs. However, noise constraints applied to ESSs can restrict cooling of ESUs, reducing a corresponding level of dispatch for each ESU and a corresponding dispatch that can be provided by the ESS.

Implementations and embodiments discussed herein provide for noise-constrained dispatch of ESUs to meet target ESS dispatches within the bounds of location-based noise constraints. Embodiments discussed herein include determining a subset of ESUs to be dispatched based on a location of the subset of ESUs relative to a point of noise control (PONC). The subset of ESUs can be a minimum subset of ESUs to meet the target ESS dispatch. The subset of ESUs can be a maximum subset of ESUs within the noise constraint. The subset of ESUs can be dynamically determined based on a cost function that takes into account multiple variables including the noise constraint and a cost of violating constraint as well as a degradation cost, and an energy cost. A dispatch controller of the ESS can generate and transmit control signals to the individual ESUs of the ESS to dispatch the subset of ESUs based on the target ESS dispatch and the noise constraint. In this way, the dispatch controller can solve the technical problem of meeting the target ESS dispatch within the noise constraint, thus increasing locations where ESSs can be deployed and increasing a dispatch of the deployed ESSs.

FIG. 1 is a block diagram of an example system 100 including a dispatch controller 110 and an energy storage system (ESS) 120. The ESS 120 includes a first energy storage unit (ESU) 122a, a second ESU 122b, and a third ESU 122c, collectively referred to as ESUs 122. The ESS 120 includes a first cooling unit 124a corresponding to the first ESU 122a, a second cooling unit 124b corresponding to the second ESU 122b, and a third cooling unit 124c corresponding to the third ESU 122c, referred to collectively as cooling units 124. While the ESS 120 is illustrated as including three ESUs and three corresponding cooling units, the ESS 120 can include any number of ESUs and cooling units.

The cooling units 124 correspond to the ESUs 122, as each cooling unit cools an associated ESU. The first cooling unit 124a cools the first ESU 122a, the second cooling unit 124b cools the second ESU 122b, and the third cooling unit 124c cools the third ESU 122c. In an example, the ESUs 122 are batteries and the cooling units 124 are fans, where the cooling units 124 blow air across the ESUs 122 to reduce a temperature of the ESUs 122.

The dispatch controller 110 generates and transmits control signals to the ESUs 122. In conventional systems, the dispatch controller 110 generates control signals to evenly distribute a total target dispatch for the ESS 120 among the ESUs 122. In an example, the total target dispatch for the ESS 120 is to store 120 MWh of energy and the dispatch controller 110 generates control signals for each of the ESUs 122 to store 40 MWh of energy. In an example, the total target dispatch for the ESS 120 is to provide 120 MWh of energy and the dispatch controller 110 generates control signals for each of the ESUs 122 to discharge 40 MWh of energy. In conventional systems, the dispatch controller 110 may generate and transmit control signals for the ESUs 122, and the cooling units 124 activate to cool the ESUs 122 based on temperature thresholds without control signals from the dispatch controller 110.

As described in greater detail below, the dispatch controller 110 can generate and transmit control signals for the ESUs 122 and/or the cooling units 124 to reduce a total noise generated by the ESS 120 in order to provide the target ESS dispatch within noise constraints. The dispatch controller 110 can control the ESS 120 to minimize an amount of noise generated by the ESS 120, to maximize an amount of dispatch provided by the ESS 120, and/or to optimize the dispatch of the ESS 120 based on a cost function that takes into account energy value and noise constraint value.

Figure 2:
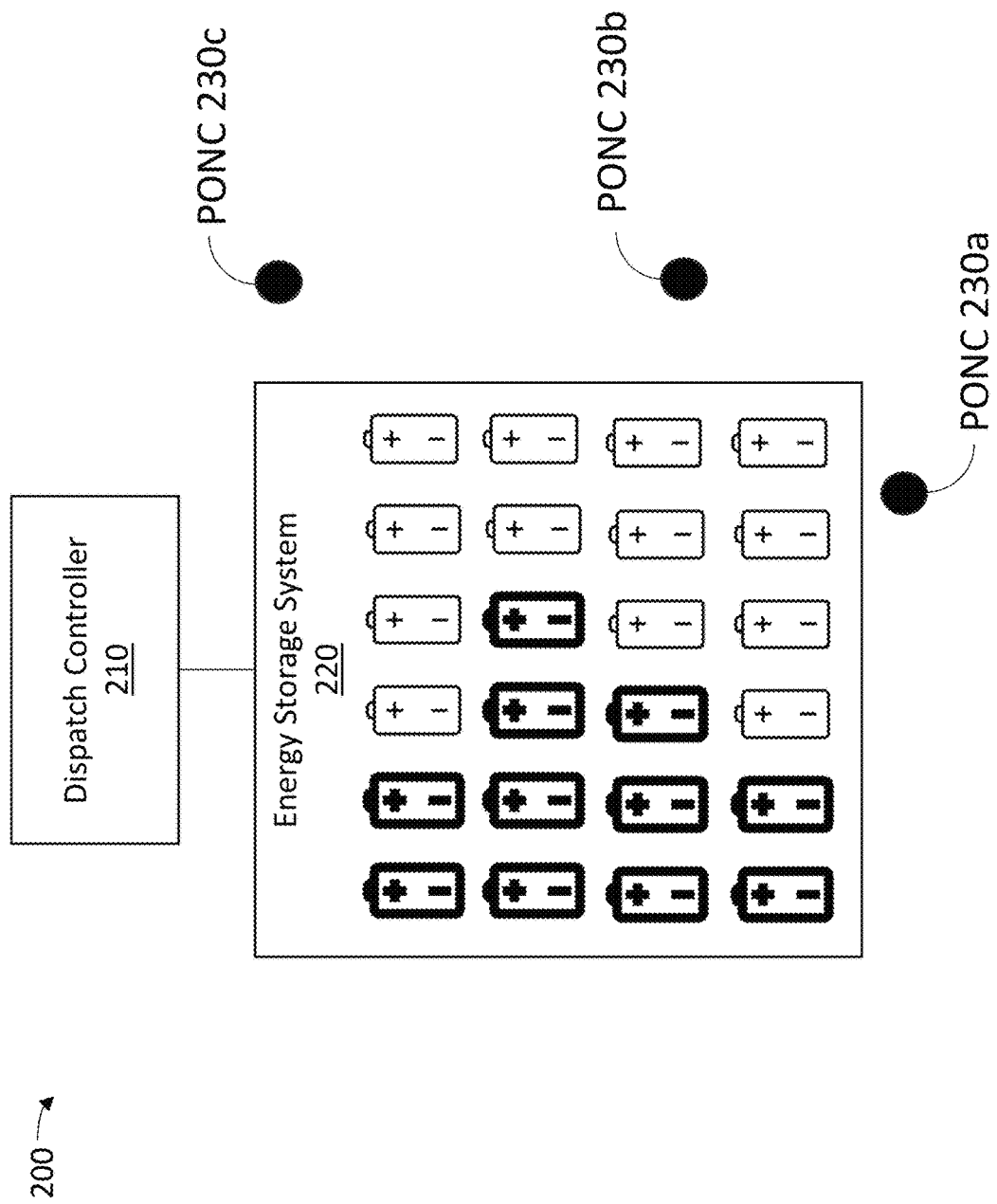
FIG. 2 is a block diagram of an example system including a dispatch controller, an ESS, and points of noise control (PONCs).

FIG. 2 is a block diagram of an example system 200 including a dispatch controller 210, an ESS 220, and points of noise control (PONCs) 230. The PONCs 230 include a first PONC 230a, a second PONC 230b, and a third PONC 230c. The ESS 220 includes a plurality of ESUs and cooling units, where each ESU and corresponding cooling unit is represented by a battery. In an example, each ESU is a battery with a corresponding cooling unit fan. In the ESS 220, ESUs that are dispatched (e.g., charging/discharging) are represented in bold, where dispatch of the ESUs causes the corresponding cooling units to activate. The dispatched ESUs of the ESS 220 are dispatched based on a location relative to the PONCs 230, with ESUs farther from the PONCs 230 dispatched and ESUs closer to the PONCs 230 not dispatched.

The PONCs 230 can be geographic locations associated with various constraints, such as noise thresholds associated with different times of day. In an example, a daytime (7 am-10 pm) noise threshold is 60 dB and a nighttime (10 pm-7 am) noise threshold is 50 dB. The PONCs 230 can be locations at which noise cannot rise above the noise thresholds, or points at which noise generated by the ESS 220 is measured. In an example, the first PONC 230a is a hospital that will not tolerate noise above the noise threshold. In this example, the hospital can include noise sensors for determining noise experienced by the hospital. In an example, the PONCs 230 are locations within a power plant corresponding to locations adjoining noise-controlled areas. In this example, the PONCs 230 can include sensors to provide real-time noise data to the dispatch controller 210.

In some implementations, the PONCs 230 are each associated with a cost or penalty for violating the corresponding noise constraint. In an example, the first PONC 230a is associated with a $5,000 penalty for each day in which a violation of the corresponding noise constraint occurs, the second PONC 230b is associated with a $300 penalty for each hour in which a violation of the corresponding noise constraint occurs, and the third PONC 230c is associated with a temporary cessation of activity in response to a violation of the corresponding noise constraint. The costs or penalties of the PONCs 230 can vary based on time of day, time of year, or intensity. In an example, the PONCs 230 are associated with lower penalties for daytime noise constraint violations and higher penalties for nighttime noise constraint violations. In an example, the PONCs 230 each have a lower noise threshold associated with a lower penalty, and a higher noise threshold associated with a higher penalty.

In some implementations, the dispatch controller 210 weights the different noise constraints of the PONCs 230 according to the associated costs or penalties. In an example, in determining which ESUs of the ESS 220 to dispatch, the dispatch controller 210 can determine a subset of the ESUs based on distance from the PONCs 230, as weighted according to the costs or penalties associated with violation of the noise thresholds of the PONCs 230.

In some implementations, the dispatch controller 210 generates the control signals for the ESUs of the ESS 220 based on real-time sensor data captured at the ESUs and/or the PONCs 230. In some implementations, the dispatch controller 210 generates the control signals based on predetermined noise contribution values for each ESU. In an example, a noise of a cooling unit of a particular ESU is known (e.g., measured), and a noise contribution of the particular ESU for each of the PONCs 230 can be calculated based on a location of the particular ESU and intervening objects (e.g., other ESUs, fences, etc.). The noise of a cooling unit may be fixed and not dependent upon the temperature of the corresponding ESU. Thus, dispatching half of the ESUs can result in reducing an overall noise of the ESS 220 by half.

The illustrated dispatch (in bold) of the ESUs of the ESS 220 can correspond to a variety of scenarios described in greater detail below. The illustrated dispatch can correspond to control signals to minimize an amount of noise reaching the PONCs 230 when providing a predetermined amount of dispatch. The illustrated dispatch can correspond to control signals to maximize an amount of dispatch while maintaining an amount of noise reaching the PONCs 230 below the associated noise thresholds. The illustrated dispatch can correspond to control signals to optimize a value of the dispatch based on energy values and the penalties associated with violating the noise constraints.

FIG. 3A illustrates an example ESS 320 with all energy storage units (ESUs) dispatched. The ESUs are illustrated as dispatched using bold lines. The dispatch of the ESUs of the ESS 320 causes the corresponding cooling units to run, generating noise. While the ESUs generate noise (i.e., generated by the running cooling units), each ESU contributes a different amount of its noise to the PONC 330 based on its distance from the PONC 330. As discussed herein, the noise generated by a cooling unit is independent of an amount of dispatch, such that the cooling unit generates an equal amount of noise when the corresponding ESU is dispatched. In an example, each ESU produces 50 dB of noise, with a percentage of the noise reaching the PONC 330 according to a noise contribution factor. In this example, the ESS 320 is dispatched at 33.3% and the total dispatch is evenly distributed between the ESUs such that each ESU is dispatched (i.e., charging/discharging) at 33.3%, causing the cooling units to all be running. The noise generated by each ESU, and the noise contributed to the PONC 330 by each ESU, is illustrated in Table 1, where ESU 1 is the left-most ESU, with ESU numbers ascending from left to right.

TABLE 1

|  | ESU 1 | ESU 2 | ESU 3 | ESU 4 | ESU 5 | ESU 6 | PONC (Noise experienced at PONC) |
| --- | --- | --- | --- | --- | --- | --- | --- |
| Noise | 50 dB | 50 dB | 50 dB | 50 dB | 50 dB | 50 dB | 67.5 dB |
| Noise Contribution Factor | 10% | 15% | 20% | 25% | 30% | 35% | N/A |
| ESU Dispatch | 33.3% | 33.3% | 33.3% | 33.3% | 33.3% | 33.3% | N/A |

As illustrated in Table 1, with all the ESUs of the ESS 320 dispatched as in FIG. 3A, the PONC 330 experiences 67.5 dB of noise from the ESS 320.

In some implementations, control signals for the dispatch of the ESUs of the ESS 320 are generated to minimize a noise experienced at the PONC 330. In the example illustrated in FIG. 3B, a total dispatch of the ESS 320 is 33.3% (the same as the total dispatch in FIG. 3A), but the dispatch is concentrated in only two ESUs, where the number of ESUs and the location of the ESUs is selected to minimize the noise contributed to the PONC 330. For the example illustrated in FIG. 3B, the noise generated by each ESU, and the noise contributed to the PONC 330 by each ESU, is illustrated in Table 2.

TABLE 2

|  | ESU 1 | ESU 2 | ESU 3 | ESU 4 | ESU 5 | ESU 6 | PONC (Noise experienced at PONC) |
|---|---|---|---|---|---|---|---|
| Noise | 50 dB | 50 dB | 50 dB | 50 dB | 50 dB | 50 dB | 12.5 dB |
| Noise Contribution Factor | 10% | 15% | 20% | 25% | 30% | 35% | N/A |
| ESU Dispatch | 100% | 100% | 0% | 0% | 0% | 0% | N/A |

As illustrated in Table 2, with only the two leftmost ESUs of the ESS 320 dispatched as in FIG. 3B, the PONC 330 experiences only 12.5 dB of noise from the ESS 320. In some implementations, the ESUs are dispatched to minimize the noise experienced by the PONC 330 while distributing degradation (i.e., loading stress) among the ESUs. In an example, ESU 1 and ESU 6 are dispatched together to meet the target dispatch of the ESS 320, causing the PONC 330 to experience 22.5 dB. In this example, to distribute the degradation among the ESUS, ESU 2 and ESU 5 can be dispatched together at a subsequent time, causing the PONC 330 to experience 22.5 dB. In this example, to distribute the degradation among the ESUS, ESU 3 and ESU 4 can be dispatched together at a subsequent time, causing the PONC 330 to experience 22.5 dB. In this way, the PONC 330 can experience no more than 22.5 dB while distributing the degradation among the ESUs while providing the target amount of dispatch of the ESS 320.

In some implementations, control signals for the dispatch of the ESUs of the ESS are generated to maximize a dispatch provided by the ESS 320 while maintaining a noise experienced at the PONC 330 below a noise threshold. As discussed herein, the noise threshold can be based on a time of day, a time of year, and other factors, and can have an associated cost or penalty. In the example illustrated in FIG. 3C, the noise threshold is 60 dB, and control signals for the ESS 320 are generated to provide as much dispatch as possible without providing more than 60 dB to the PONC 330. In the example illustrated in FIG. 3C, all ESUs but the ESU closest to the PONC 330 (ESU 6) are dispatched to provide 83% (5/6) of maximum possible loading for the ESS 320 without exceeding the noise threshold. For the example illustrated in FIG. 3C, the noise generated by each ESU, and the noise contributed to the PONC 330 by each ESU, is illustrated in Table 3.

TABLE 3

|  | ESU 1 | ESU 2 | ESU 3 | ESU 4 | ESU 5 | ESU 6 | PONC (Noise experienced at PONC) |
|---|---|---|---|---|---|---|---|
| Noise | 50 dB | 50 dB | 50 dB | 50 dB | 50 dB | 50 dB | 50 dB |
| Noise Contribution Factor | 10% | 15% | 20% | 25% | 30% | 35% | N/A |
| ESU Dispatch | 100% | 100% | 100% | 100% | 100% | 0% | N/A |

As illustrated in Table 3, with all ESUS but the rightmost ESU of the ESS 320 dispatched as in FIG. 3C, the PONC 330 experiences 50 dB of noise from the ESS 320, which is below the noise threshold of 60 dB. In this way, the dispatch provided by the ESS 320 is maximized without violating the noise threshold of the PONC 330. In some implementations, the control signals for the ESUs of the ESS 320 are generated using a cost function including the cost or penalty for violating the noise threshold of the PONC 330 and an energy value. The control signals can cause the ESUs to violate the noise threshold if an energy value of dispatch is greater than the cost or penalty for violating the noise threshold. In an example, the penalty associated with the noise threshold is $1,000, but the current value of dispatch is $1,500, such that the control signals are generated to violate the noise threshold.

FIG. 4A illustrates an example ESS 420 with no ESUs dispatched and a single cooling unit dispatched. FIG. 4B illustrates the ESS of FIG. 4A with all ESUs dispatched and all but one cooling unit dispatched. FIGS. 4A and 4B illustrate how the cooling of an ESU can be performed before dispatch of the ESU ("pre-cooling") or after dispatch of the ESU ("post-cooling"). As discussed herein, the noise contributed to a PONC 430 is generated by cooling units corresponding to ESUs. Thus, by pre-cooling or post-cooling an ESU, a total amount of noise contributed to the PONC 430 at a time of dispatch can be reduced.

With the ESS 420 being the same, or having the same noise generation and noise contribution factors as the ESS 320 of FIGS. 3A-3C, the noise contributed to the PONC 430 in the example illustrated in FIG. 4A is illustrated in Table 4.

As illustrated in Table 5, with all of the ESUs dispatched, but with only cooling units for ESU 1-ESU 5 running, the PONC 430 only experiences 50 dB of noise from the ESS 420. In this example, the noise contributed to the PONC 430 from the ESS 420 is below a noise threshold of 60 dB associated with the PONC 430.

Pre-cooling of ESU 6 can be accomplished based on a prediction that full dispatch of the ESS 420 will be needed, causing the cooling unit corresponding to ESU 6 to be run prior to dispatch of ESU 6 as in FIG. 4A. As ESU 6 was pre-cooled, the cooling unit corresponding to ESU 6 does not need to run during dispatch of ESU 6 as in FIG. 4B. In this way, the noise generated by cooling the ESUs can be spread out over time, reducing a total noise experienced by the PONC 430 from the ESS 420 at any one time. While the example illustrated in FIGS. 4A and 4B shows a single ESU being pre-cooled, any number of ESUs can be pre-cooled to spread out the total cooling noise over time.

In some implementations, cooling units are run independent of ESU dispatch to cool the hottest ESUs while maintaining noise experienced by the PONC 430 below the noise threshold. In this way, the cooling units can reduce degradation of the ESUs based on temperature of the ESUs while limiting noise contributed to the PONC 430 below the noise threshold. Different combinations of ESUs can be cooled while maintaining the noise contributed to the PONC 430 below the noise threshold. In some implementations, the cooling units can be dispatched to cool ESUs based on an expected degradation that is correlated with temperature. In this way, a dispatched ESU at a lower temperature may be cooled before a non-dispatched ESU at a higher temperature.

TABLE 4

| | ESU 1 | ESU 2 | ESU 3 | ESU 4 | ESU 5 | ESU 6 | PONC (Noise experienced at PONC) |
|---|---|---|---|---|---|---|---|
| Noise | 50 dB | 50 dB | 50 dB | 50 dB | 50 dB | 50 dB | 50 dB |
| Noise Contribution Factor | 10% | 15% | 20% | 25% | 30% | 35% | N/A |
| ESU Dispatch | 0% | 0% | 0% | 0% | 0% | 0% | N/A |
| Cooling? | No | No | No | No | No | Yes | |

As illustrated in Table 4, with only ESU 6 generating noise, the PONC 430 only experiences 17.5 dB of noise from the ESS 420.

The noise contributed to the PONC 430 in the example illustrated in FIG. 4B is illustrated in Table 5.

In some implementations, the cooling units are run constantly in a way to maintain noise contributed to the PONC 430 below the noise threshold, with pre-cooling or post-cooling occurring dependent upon dispatch. In an example, with a noise threshold of 60 dB at the PONC 430, a dispatch

TABLE 5

| | ESU 1 | ESU 2 | ESU 3 | ESU 4 | ESU 5 | ESU 6 | PONC (Noise experienced at PONC) |
|---|---|---|---|---|---|---|---|
| Noise | 50 dB | 50 dB | 50 dB | 50 dB | 50 dB | 50 dB | 50 dB |
| Noise Contribution Factor | 10% | 15% | 20% | 25% | 30% | 35% | N/A |
| ESU Dispatch | 100% | 100% | 100% | 100% | 100% | 100% | N/A |
| Cooling? | Yes | Yes | Yes | Yes | Yes | No | | controller controls the cooling units to constantly run different combinations of cooling units to reduce the temperatures of the ESUs. In this example, lower amounts of dispatch of the ESUs result in pre-cooling of the ESUs, as there is more cooling than demanded by the temperatures of the ESUs, while higher amounts of dispatch of the ESUs result in post-cooling of the ESUs, as there is less cooling than demanded by the temperatures of the ESUs.

In some implementations, a predetermined amount of pre-cooling is performed without an anticipated dispatch in order to absorb any unexpected spikes in dispatch. In this way, the predetermined amount of pre-cooling can be used as a "spinning reserve" of cooling, allowing for greater dispatch of the ESUs without exceeding the noise threshold.

Figure 5:
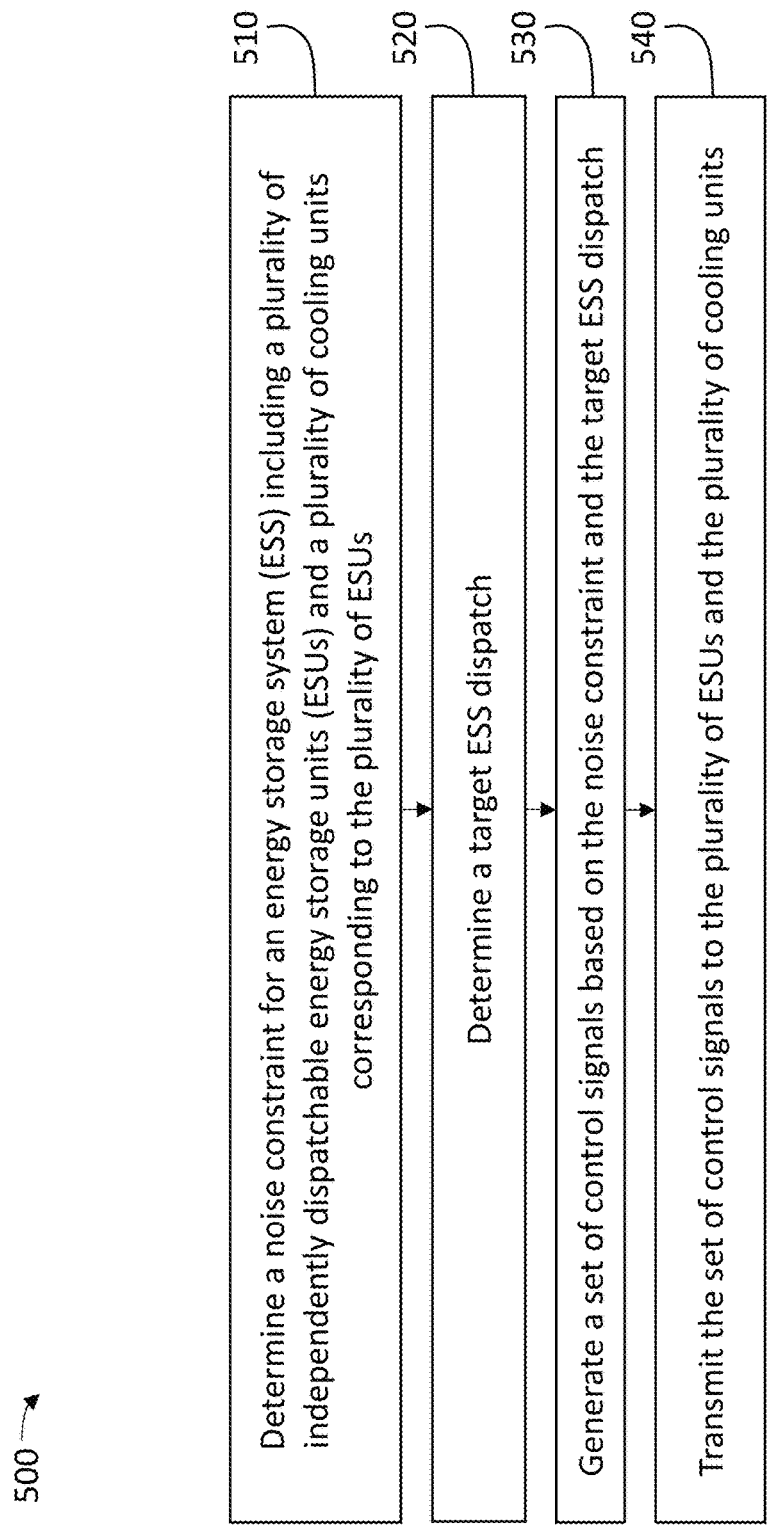
FIG. 5 is a flowchart illustrating operations of an example method for controlling an ESS based on a noise constraint.

FIG. 5 is a flowchart illustrating operations of an example method 500 for controlling an ESS based on a noise constraint. The method 500 may include more, fewer, or different operations than shown. The operations may be performed in the order shown, in a different order, or concurrently. The method 500 may be performed by one or more components of the system 100 of FIG. 1, such as the dispatch controller 110. The method 500 may be performed by one or more components of the system 200 of FIG. 2, such as the dispatch controller 210.

At operation 510, a dispatch controller determines a noise constraint for an energy storage system (ESS) including a plurality of independently dispatchable energy storage units (ESUs) and a plurality of cooling units corresponding to the plurality of ESUs. In some implementations, the noise constraint for the ESS includes a plurality of noise thresholds associated with a corresponding plurality of geographic locations. In some implementations, the noise constraint includes a noise threshold corresponding to a time interval. The time intervals can include times of day, particular days, and/or seasons. In an example, the noise constraint includes a summer noise threshold and a winter noise threshold for a wildlife refuge, a daytime noise threshold and a nighttime noise threshold for a hospital, and a summer daytime noise threshold, a summer nighttime noise threshold, a winter daytime noise threshold, and a winter nighttime noise threshold for a school.

At operation 520, the dispatch controller determines a target ESS dispatch. The target ESS dispatch can be an amount of energy to be stored by the ESS and/or an amount of energy to be provided by the ESS. The target ESS dispatch can be an amount of power to be stored or provided in response to a request from a utility grid. The target ESS dispatch can be an amount of power to be stored or provided in response to a request from a renewable energy power plant including the ESS. In some implementations, the target ESS dispatch is based on a predicted renewable energy source output and/or a predicted demand. In an example, the target ESS dispatch is to store energy generated by photovoltaic panels during the data and to provide the stored energy at night.

At operation 530, the dispatch controller generates a set of control signals based on the noise constraint and the target ESS dispatch. Generating the set of control signals based on the noise constraint includes generating the set of control signals for the ESUs based on the noise contributions of the ESUs to a noise threshold. The noise contributions are how much noise each ESU contributes to the noise threshold and depend upon a volume of the ESU (i.e., a cooling unit cooling the ESU), a location of the ESU (e.g., distance from a PONC), directionality of noise from the ESU, and intervening objects between the ESU and the PONC. Generating the set of control signals base don the target ESS dispatch includes generating the set of control signals for the ESUs based on contribution of the ESUs to the target ESS dispatch. Generating the control signals based on both the noise constraint and the target ESS dispatch includes determining a subset of the ESUs to dispatch and/or cool based how the subset of the ESUs contribute to the target ESS dispatch and how the subset of the ESUs contribute to the overall noise of the ESS relative to the noise threshold.

The dispatch controller can generate the set of control signals based on the noise constraint, the target ESS dispatch, predicted degradation, predicted energy losses, and energy values (e.g., electricity prices). In some implementations, the controller generates the set of control signals by calculating a dispatch value using an energy value and a noise constraint violation value. The dispatch value can indicate a value of the target ESS dispatch and/or a value of dispatching each individual ESU. The dispatch value can be calculated using the energy value (e.g., current electricity price), the noise constraint violation value (e.g., penalty, cost), a predicted degradation, and predicted energy losses to determine the dispatch value. The dispatch value can be positive or negative. In an example, an ESU is dispatched and cooled, contributing noise to a PONC towards the noise constraint, based on its dispatch value being positive. In an example, an ESU is not dispatched and not cooled, reducing noise contributed to the PONC towards the noise constraint, based on its dispatch value being negative.

At operation 540, the dispatch controller transmits the set of control signals to the plurality of ESUs and the plurality of cooling units. The dispatch controller can transmit individual control signals from the set of control signals to each ESU and cooling unit. In some implementations, the set of control signals causes the ESS to meet the target ESS dispatch without violating the noise constraint for the ESS.

In some implementations, the set of control signals cause a subset of the plurality of cooling units to cool a corresponding subset of the plurality of ESUs prior to dispatch of the corresponding subset of the plurality of ESUs. This "pre-cooling" of the subset of the plurality of ESUs can allow for the subset to not be cooled during dispatch of the ESUs, or while other ESUs are being cooled, reducing an amount of noise generated by the ESS. As discussed herein, this pre-cooling can be performed in response to a predicted ESS dispatch or to provide a reserve of noise or cooling to respond to unexpected ESS dispatch. In an example, a subset of ESUs are pre-cooled in response to a predicted or scheduled ESS dispatch such that the subset of ESUs are cooled up until the dispatch but not during the dispatch and other ESUs of the ESS are cooled only during the dispatch.

In some implementations, the set of control signals cause a subset of the plurality of cooling units to cool a corresponding subset of the plurality of ESUs after dispatch of the corresponding subset of the plurality of ESUs. This "post-cooling" can allow for the subset of the plurality of ESUs to not be cooled during dispatch of the ESUs, or while other ESUs are being cooled, reducing an amount of noise generated by the ESS. In some implementations, the controller generates the set of control signals to allow the subset of the plurality of ESUs to have a temperature above a threshold cooling temperature during dispatch of the subset of the plurality of ESUs. The threshold cooling temperature can be a temperature that ordinarily triggers cooling of an ESU to reduce degradation of the ESU. However, the dispatch controller can generate control signals to override this threshold cooling temperature to allow for ESUs to reach higher temperatures in order to maintain an amount of noise below a noise threshold.

Pre-cooling and post-cooling can be performed separately or together. In an example, a subset of ESUs are pre-cooled and post-cooled. In an example, a first subset of ESUs are pre-cooled and a second subset of ESUs are post-cooled. Pre-cooling and/or post-cooling can be combined with cooling during dispatch. The dispatch controller can dynamically determine which ESUs will be dispatched and cooled, utilizing pre-cooling, post-cooling, and/or cooling during dispatch. The dispatch controller can calculate a dispatch/cooling value based on an energy value, a noise constraint value, a degradation value, and an energy loss value, where ESUs are dispatched/cooled based on the dispatch/cooling value being positive. In this way, the dispatch controller can adapt the control signals based on changing variables. In an example, the dispatch controller can generate the control signals to cause the ESS to violate the noise constraint in response to an energy value (e.g., value of storing or providing energy) increasing to a point that the energy value justifies violating the noise constraint (i.e., causes the dispatch/cooling value to be positive).

In some implementations, the method 500 includes, in response to noise data from one or more noise sensors, generating, by the dispatch controller, an additional set of control signals based on the noise constraint, the target ESS dispatch, and the noise data. In this way, the dispatch controller can dynamically generate control signals in response to real-time noise data.

In some implementations, the method 500 includes determining, by the dispatch controller, based on noise data from one or more sensors, a noise contribution of each of the plurality of cooling units. The noise contribution of each of the plurality of cooling units can be determined prior to dispatch of the ESS and prior to generating dispatch control signals. In an example, in response to a new noise threshold associated with a PONC, noise sensor data is collected from the PONC to determine the noise contribution of each of the plurality of cooling units by running each cooling unit separately. In this example, the noise contributed to the PONC by each cooling unit is stored for use in calculating a total noise contributed to the PONC by the ESS during dispatch. In some implementations, the noise contribution of each of the plurality of cooling units is determined in real time using the noise data. In an example, noise sensors at a PONC provide the noise data such that the dispatch controller can determine in real time the noise experienced at the PONC and adjust the dispatch of the cooling units and/or ESUs. In this way, varying conditions can be accounted for in real time, such as cooling unit malfunction that results in increased noise, trimming of trees and bushes that reduces noise shielding, and wind direction resulting in more or less noise reaching the PONC from the ESS.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a model stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system comprising:
an energy storage system (ESS) comprising:
a plurality of independently dispatchable energy storage units (ESUs); and
a plurality of cooling units corresponding to the plurality of ESUs;
a dispatch controller configured to:
determine a noise constraint for the ESS, the noise constraint including a noise threshold associated with a geographic location;
determine a target ESS dispatch;
generate a set of control signals based on the noise constraint and the target ESS dispatch; and
transmit the set of control signals to the plurality of ESUs and the plurality of cooling units.

2. The system of claim 1, wherein the noise constraint for the ESS includes a plurality of noise thresholds associated with a corresponding plurality of geographic locations.

3. The system of claim 1, wherein the noise constraint includes a noise threshold corresponding to a time interval.

4. The system of claim 1, wherein the set of control signals causes the ESS to meet the target ESS dispatch without violating the noise constraint for the ESS.

5. The system of claim 1, wherein the dispatch controller generates the set of control signals by calculating a dispatch value using an energy value and a noise constraint violation value.

6. The system of claim 1, wherein the set of control signals cause a subset of the plurality of cooling units to cool a corresponding subset of the plurality of ESUs prior to dispatch of the corresponding subset of the plurality of ESUs.

7. The system of claim 1, wherein the set of control signals cause a subset of the plurality of cooling units to cool a corresponding subset of the plurality of ESUs after dispatch of the corresponding subset of the plurality of ESUs.

8. The system of claim 7, wherein the controller generates the set of control signals to allow the subset of the plurality of ESUs to have a temperature above a threshold cooling temperature during dispatch of the subset of the plurality of ESUs.

9. The system of claim 1, further comprising one or more noise sensors, wherein the controller is further configured to, in response to noise data from the one or more noise sensors, generate an additional set of control signals based on the noise constraint, the target ESS dispatch, and the noise data.

10. The system of claim 1, further comprising one or more noise sensors, wherein the controller is further configured to determine, based on noise data from the one or more sensors, a noise contribution of each of the plurality of cooling units.

11. A method comprising:
determining, by a dispatch controller, a noise constraint including a noise threshold associated with a geographic location for an energy storage system (ESS) comprising:
a plurality of independently dispatchable energy storage units (ESUs); and
a plurality of cooling units corresponding to the plurality of ESUs;
determining, by the dispatch controller, a target ESS dispatch;
generating, by the dispatch controller, a set of control signals based on the noise constraint and the target ESS dispatch; and
transmitting, by the dispatch controller, the set of control signals to the plurality of ESUs and the plurality of cooling units.

12. The method of claim 11, wherein the noise constraint for the ESS includes a plurality of noise thresholds associated with a corresponding plurality of geographic locations.

13. The method of claim 11, wherein the noise constraint includes a noise threshold corresponding to a time interval.

14. The method of claim 11, wherein the set of control signals causes the ESS to meet the target ESS dispatch without violating the noise constraint for the ESS.

15. The method of claim 11, wherein generating, by the dispatch controller, the set of control signals includes calculating a dispatch value using an energy value and a noise constraint violation value.

16. The method of claim 11, wherein the set of control signals cause a subset of the plurality of cooling units to cool a corresponding subset of the plurality of ESUs prior to dispatch of the corresponding subset of the plurality of ESUs.

17. The method of claim 11, wherein the set of control signals cause a subset of the plurality of cooling units to cool a corresponding subset of the plurality of ESUs after dispatch of the corresponding subset of the plurality of ESUs.

18. The method of claim 17, wherein generating, by the dispatch controller, the set of control signals to allow the subset of the plurality of ESUs to have a temperature above a threshold cooling temperature during dispatch of the subset of the plurality of ESUs.

19. The method of claim 11, further comprising, in response to noise data from one or more noise sensors, generating, by the dispatch controller, an additional set of control signals based on the noise constraint, the target ESS dispatch, and the noise data.

20. The method of claim 11, further comprising determining, by the dispatch controller, based on noise data from one or more sensors, a noise contribution of each of the plurality of cooling units.

* * * * *